H. HARVEY.
COMBINED BOTTLE STOPPER AND MEASURING DEVICE.
APPLICATION FILED NOV. 12, 1919. RENEWED MAY 20, 1921.
1,402,604.
Patented Jan. 3, 1922.
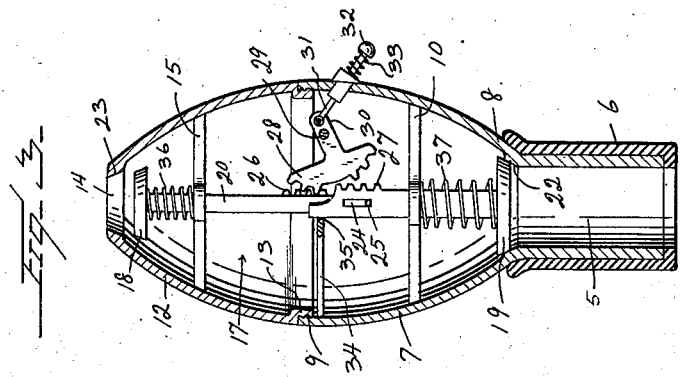
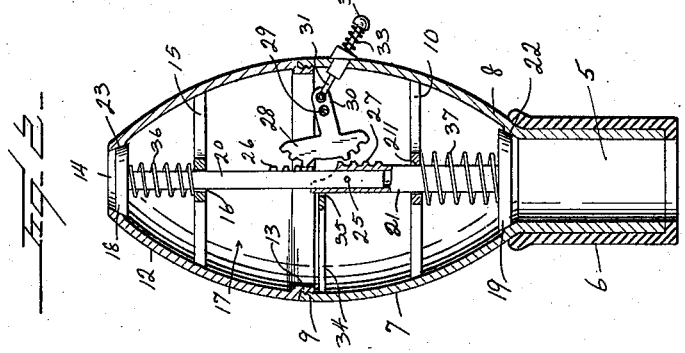
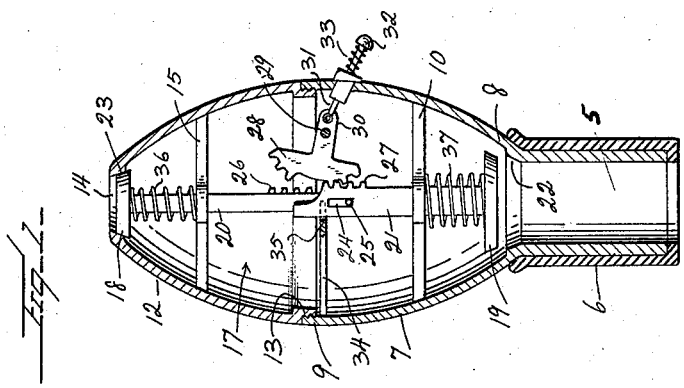
Inventor
H. Harvey
By Watson E. Coleman
Attorney

UNITED STATES PATENT OFFICE.

HERSCHEL HARVEY, OF MACON, GEORGIA.

COMBINED BOTTLE STOPPER AND MEASURING DEVICE.

1,402,604.  Specification of Letters Patent.  Patented Jan. 3, 1922.

Application filed November 12, 1919, Serial No. 337,507. Renewed May 20, 1921. Serial No. 471,155.

*To all whom it may concern:*

Be it known that I, HERSCHEL HARVEY, a citizen of the United States, residing at Macon, in the county of Bibb and State of Georgia, have invented certain new and useful Improvements in Combined Bottle Stopper and Measuring Devices, of which the following is a specification, reference being had to the accompanying drawings.

This invention relates to a combined bottle stopper and measuring device and has for its object to provide a device of this character capable of permitting the discharge of the contents of a bottle in exactly the quantity desired.

Another object is to provide a device of this character wherein the measuring device cooperates to form part of the stopper of the bottle so as to render the device compact.

Another object is to provide a stopper, one portion of which includes a chamber in which the liquid is measured, said chamber being provided with means for stopping communication with the bottle and permitting discharge of the liquid from the chamber and for preventing discharge of the liquid from the chamber and permitting communication of the same with the bottle.

Another object of the invention is to provide a device of this character including a chamber in which a plurality of valves are mounted, said valves being constantly urged to close the opening of the chamber, and means manually and automatically operable to alternately open the valves.

With these and other objects in view the invention consists in the improved construction and arrangement of parts to be hereinafter more particularly described and fully claimed and illustrated in the accompanying drawings in which:—

Figure 1 is a longitudinal sectional view of the stopper and measuring device with the various parts in their normal position after being automatically operated.

Figure 2 is a longitudinal sectional view showing the position the valves occupy at the beginning of the manual operation of the stopper.

Figure 3 is a longitudinal sectional view showing the position of the valve when the contents of the measuring chamber is being discharged.

Referring to the drawings, 5 indicates a tubular member which is surrounded by a collar 6 of rubber or like material to provide a stopper to be disposed in the neck of the bottle. Projecting from one end of the tubular member 5 is a bowl 7 having an open end 8 and a threaded end 9. Extending transversely of the bowl is a spider 10 provided with a central opening 11 which is disposed over the open end 8. A bowl 12 including an interiorly threaded end 13 is connected to the threaded end of the bowl 7. The bowl 12 has an open end 14 and a spider 15 which extends transversely of the bowl and has a central opening 16 disposed over the open end 14. The bowls 7 and 8 cooperate to provide an elliptical chamber 17 in which the contents of the bottle is measured.

In order to alternately close the ends of the chamber 17 a pair of valves 18 and 19 including valve stems 20 and 21 are slidably mounted in the chamber, the valve 19 being slidably supported by the spider 10 while the valve 18 is slidably disposed by the spider 15. The valve 19 is adapted to engage the valve seat 22 formed in the bowl 10 while the valve 18 is adapted to engage the valve seat 23 formed in the bowl 12 so as to permit the valves to close the openings 8 and 14 respectively. The inner end of the valve stem 20 is intended to telescope the inner end of the valve stem 21, to permit the valves to be moved inwardly without interfering with each other. The valve stem 21 has an elongated slot 24 which extends transversely of the stem and is adapted to receive a pin 25 disposed through the end of the stem 20. The pin 25 is intended to engage the end wall of the elongated slot 24 to assist in holding the valve 19 closed and at the same time to permit the proper alignment of the valve stems.

Each valve stem adjacent its inner end includes a rack 26 and 27 adapted to be engaged by a segmental gear 28 which is pivotally mounted in the chamber as at 29. The gear 28 includes a projecting arm 30 to the end of which a plunger 31 is connected. This plunger extends through the casing and is provided with an operating head 32. A spring 33 is mounted on the plunger between the exterior surface of the plunger and the head 32. This spring is of the expansion type and is intended to automatically force the plunger outwards from the chamber.

Extending inwardly from the intermediate portion of the chamber is a support 34 having a grooved end 35 adapted to receive and slidably support the telescoping ends of the valve stems. A spring 36 is mounted on the valve stem 20 between the valve 18 and the spider 15 while a spring 37 is mounted on the valve stem 31 between the valves 19 and the spider 10. These springs are of the expansion type and are intended to force the valves into engagement with the valve seats. The spring 33 however is stronger than the spring 37 and is intended to automatically over-come the tendency of the latter spring to close the open end 8.

When not in use the valve 18 is forced into engagement with the valve seat 23 to close the end 14 by means of the spring 36. As the power of the spring 33 is greater than the spring 37 the action of the spring 33 causes the plunger to move outwards and move one portion of the gear into engagement with the rack 27 of the valve stem 21 so as to move the valve inwardly against the tension of the spring 37 and open the end 8. During this position, liquid may be admitted into the chamber. The plunger is then manually operated to compress the spring 33, and force the plunger inwardly so as to permit the gear 28 to oscillate in the opposite direction and engage the rack 26 of the valve stem 20 and move the valve 18 away from the end 14 to open the same against the tension of the spring 36. During this operation the gear 28 is disengaged from the rack 27 and through the power of the spring 37 the valve 19 is moved outwardly to close the end 8 and prevent communication with the bottle. The contents of the chamber may then be removed through the end 14. When the plunger 31 is released the expansion of the spring 33 causes the gear 28 to engage the rack 27 and open the end 8. The valve 18 being then free from engagement with the gear 28 is moved to its closed position through the medium of the spring 36.

In addition to the spring 37 holding the valve 19 closed, the pin 25, when the plunger 31 is manually operated engages the end wall of the slot 24 and provides additional security against accidental opening of the valve 19 when the valve 18 is open and the contents of the chamber is being discharged.

From the foregoing it will be readily seen that this invention provides a novel combined stopper and measuring chamber including a novel valve mechanism which is automatically operated to prevent discharge of the liquid from the chamber and manually operated to permit discharge of the liquid from the chamber, so that in addition to the novel measuring feature, evaporation or spilling of the contents of the bottle is eliminated.

What is claimed is:—

1. A device of the character described comprising a chamber open at its ends, opposed valves including valve stems mounted in said chamber for closing said ends, springs on said stems for holding said valves closed, each of said valve stems including racks, and a gear carried by the chamber for alternate engagement with said racks to retract said valves.

2. A device of the character described comprising a chamber open at its ends, a plurality of valve stems mounted in said chamber, a valve on one end of each stem, a spring engaged with each valve for holding the valves closed, said valve stems telescoping each other adjacent their inner ends, racks carried by each valve stem adjacent the telescoping ends, a gear carried by the casing for interchangeable engagement with said racks, and a spring pressed plunger connected to said gear, said plunger being automatically and manually operable to alternately engage the racks of the valve stems.

3. A device of the character described comprising a chamber open at its ends, a pair of valve stems mounted in said chamber, a valve on one end of each stem, spring means for holding said valves closed, one of said valve stems being hollow and having registering slots in its sides, said hollow valve stem being arranged to receive the adjacent end portion of the other valve stem for telescoping movement, a pin extending laterally of the last mentioned valve stems, said pin being slidable in the slots of the hollow valve stem, said pin causing said valves to assist in alternately holding each other closed, racks carried by each valve stem adjacent the telescoping ends of said stems, a gear pivoted in the casing for engagement with said racks, and a spring pressed plunger pivoted at one end to the gear, the other end of said plunger extending through the chamber, said plunger being manually operable to retract and hold one of the said valves open and automatically operable when released to retract and hold the other valve open through the medium of the gear.

In testimony whereof I hereunto affix my signature.

HERSCHEL HARVEY.